July 3, 1962 W. A. ANDERSON 3,042,300
CONTROL MECHANISM FOR AN ADDING MACHINE
Original Filed Dec. 29, 1955
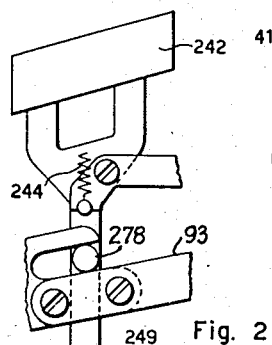
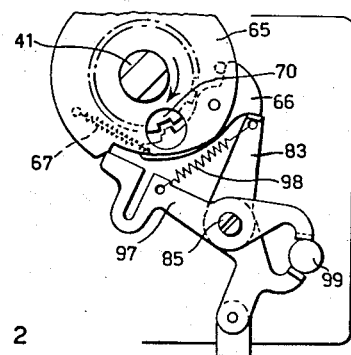
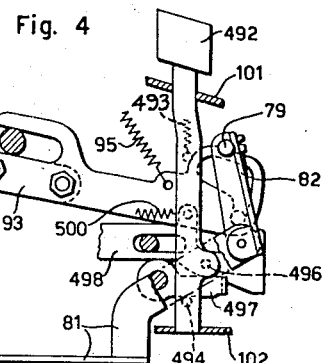
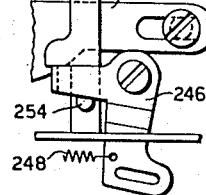
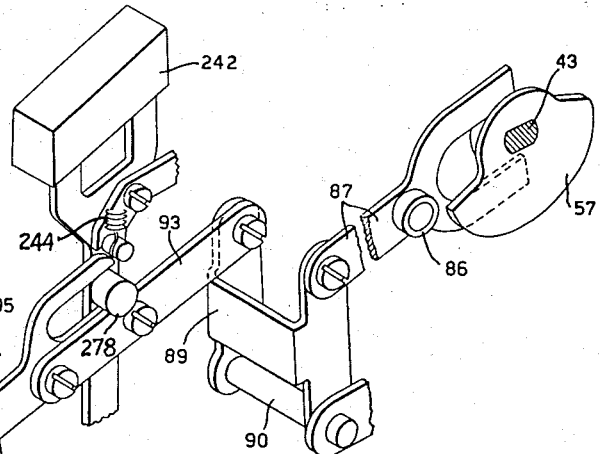
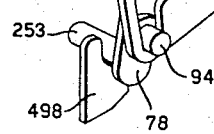
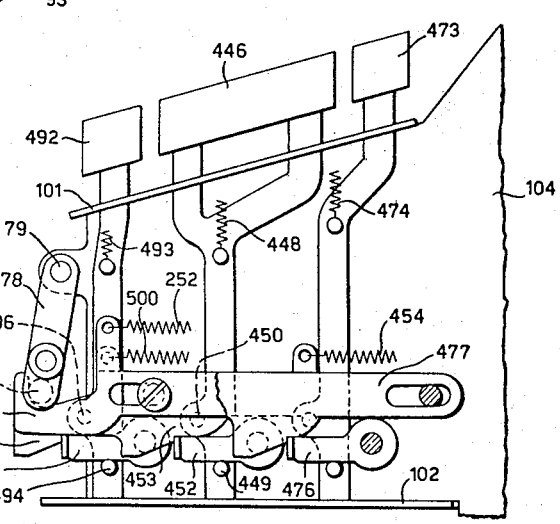

3,042,300
Patented July 3, 1962

3,042,300
CONTROL MECHANISM FOR AN ADDING MACHINE

Walter A. Anderson, Trumbull, Conn., assignor to Underwood Corporation, New York, N.Y., a corporation of Delaware
Original application Dec. 29, 1955, Ser. No. 556,217, now Patent No. 2,942,776, dated June 28, 1960. Divided and this application Dec. 14, 1959, Ser. No. 2,794
6 Claims. (Cl. 235—62)

This invention relates to adding machines in general and more particularly to improvements in control mechanisms for such machines for causing the machine to perform various functions or operations with greater ease and capability of speed.

The subject matter herein covered is divided from an original application Serial No. 556,217, filed December 29, 1955 and now matured into Patent No. 2,942,776, dated June 28, 1960.

It is one object of the invention to provide efficiently, key-controlled, power driven members for causing various machine functions to be instituted, such members being variously releasable under key control to govern the machine to predetermined desired machine functions and in connection therewith to institute a machine cycle. The provision of such members lightens the finger pressure ordinarily necessary for operation of the control keys.

An object adjunct to the foregoing object is to provide efficient means whereby the machine may be caused to function repeatedly in the same manner at the will of the operator.

Still other objects and features of the invention will be apparent upon the consideration of the description which follows and in the light of the accompanying drawing. For environment background, reference may be had to said Patent No. 2,942,776.

FIGURE 1 is a right hand side elevation of a keyboard portion of the subject machine and incorporating some function controlling keys, FIGURE 2 is a fractional view of immediate mechanism associated with a repeat function key, FIGURE 3 is a perspective illustrating a repeat function key and associated mechanism, and FIGURE 4 is a left hand side elevation of a cycling clutch and some related mechanism.

The machine of the invention is designed for high speed of operation and includes a rotary drive and related mechanism whereby through a number of function controlling cycling keys, a number of different function controlling members are adapted to power-set the machine differentially for desired functions and cause the machine to execute a cycle to carry out such functions. The construction lightens the work load imposed on the keys and permits their operating load to be more uniform, not unlike the light load which is present in connection with usual amount indexing keys, not shown.

Referring now first to FIGURE 4, the machine embodies a toothed hub 70 on a drive pulley, not shown, and which may be constantly motor-driven. A shaft 41, turnably supports said pulley and hub and has unitarily turnable therewith a disk 65 having a clutch dog 66 thereon which is normally held disengaged from the hub by a clutch controlling lever 83. Operation of said lever will cause a spring 67 to engage said clutch dog 66, causing the disk 65 and shaft 41 to receive a cyclic turn, generally as is well known in the art. The lever 83 has pivotal support on a stud 85 and a detent lever 97 having pivotal support on the same stud, by cooperation with a notch in the disk 65, prevents backward rotation of the latter when full cycle position is reached. A spring 98 extending between the levers 83 and 97 urges them to stand normally oppositely positioned against a stud 99.

The machine embodies a number of function instituting keys 492, 446, 473 and 242. The key 446 is for conditioning the machine to execute an adding operation if preceding its depression an amount stands indexed. The same key if operated while no amount stands indexed will institute a sub-total operation. The key 492 is for causing the machine to print an indexed amount without it being run into the register. The same key if depressed without an amount standing indexed, will cause a total taking operation to take place. The key 242 is a repeat operation key which if operated will cause an indexed amount to remain indexed to be repeatedly added in uninterrupted cycling operations until it is permitted to restore. The key 473 is for causing the machine to execute a subtracting operation.

As will be brought out later herein, the operation of any one of these function control keys 492, 446, 473 and 242 is adapted to institute a cyclic turn of the shaft 41 through operation of the clutch controlling lever 83. Said keys are biased upwardly to restored positions respectively by light springs 493, 448, 474 and 244 and are supported vertically slidable in slots of a top and a bottom keyboard plate 101 and 102.

The keys 492, 446, 242 and 473 have respectively slide members 498, 453, 249 and 477 related thereto which severally are urged rearwardly by strong springs 500, 454, 252 and another spring not shown. Latch elements 497, 452, 246 and 476 associated with individual shoulders on said slide members, respectively keep them normally latched in their normal, forward moved positions as shown. The key 492 has a pin 496 thereon which at operation thereof will release the latch element 497 clear of the shoulder of the related slide member 498 so that the latter will move rearwardly under the power of the spring 500. Similarly the key 446 has a pin 450 for releasing its related slide member 453. The latch element 476 is releasable by a similar pin on key 473. The repeat operation key 242 is adapted to release its related latch element by an overlying lug thereon instead of by a pin. Furthermore, a spring 248 tends to move the latch 246 to effective position.

Each of the slides has at its front end an upreaching ear, and all these ears lie in front of a pin 253 which is carried on the lower end of an arm 78 which is fast on a shaft 79. The latter is pivotally supported in the side walls 104 of a keyboard structure having top and bottom plates 101, 102. Said shaft 79 has at its left end an arm 82 which by a link 81 has connection with the clutch controlling lever 83.

It will be seen that a rearward spring-power effected operation of any slide member 498, 453, 477 or 249 will result in a rearward operation of the arm 78 and an engagement of the clutch 66, 70. Furthermore, any of said slide members when so operated rearwardly will by a cam formation which is provided thereon directly forwardly of the latch shoulder, force the related latch element further downward and will hold it there pending a cycle-effected forcible return of the related slide member, as will become evident hereinafter.

On a shaft 43 which is concentrically arranged with the shaft 41 and rotates unitarily therewith, there is mounted a cam 57. Under the control of this cam, the arm 78 is adapted to be cycle restored to its normal, forwardly swung position, thereby to restore any operated slide member and also the clutch controlling lever 83. The mechanism for this comprises a link 93 which by means of an inverted L-shaped slot has connection with a pin 94 that projects rightwardly from the stated arm 78 that carries the slide restoring pin 253. The link 93 is under a constant upward urge by a spring 95, so that normally the pin 94 is operatively connected in the lower end of the slot. At the rear end, the link 93 has a pivotal connection with a link 87, through the medium of a yoke 89, the latter being pivotally carried on a frame-supported stud 90. The link 87 has a fork or slot for guidance squarely to the shaft 43 and carries forwardly of the cam 57 a roller 86 by means of which such cam is adapted to displace the link 87. In the full cycle position of the machine, the cam 57 is in the position seen in FIGURE 3, and allows a rearward movement of the roller 86 and its supporting link 87. However, the spring 98 of the clutch controlling lever 83, through the arm 78, maintains normally the links 93 and 87 in forward positions. When in the full cycle position of the machine any one of the slides 498, 453, 477 or 249 is caused to be operated by the release of its related latch element, it will result in a rearward displacement of the links 93, 87. In a late phase of any machine cycle instituted by any of the stated keys, the cam 57 acts on the roller 86 to restore said links forwardly. If the operated key is any one but the repeat key 242, then the forward restoration of the links will be transmitted to the slide restoring arm 78 and thus will also have a clutch opening effect. If the repeat key 242 is operated, then said links will also be cam moved forwardly, but there will be a restoring effect on the arm 78 only if the key is very quickly released, as will become evident later herein.

The keys 492, 446 and 473 have each a lower pin under their related latch elements 497, 452 and 476, such pins in reference to the elements 497 and 452 being numbered 494 and 449, respectively. These lower pins limit the downstroke of the keys. Furthermore, through these pins, each of the keys 492, 446 and 473 becomes automatically blocked against restoration as its related latch element becomes cam actuated by a slide member. It follows thus that if upon operation of any of the keys 492, 446 or 473 the operator removes the finger from the key before the cycle is completed and thus the cam 57 arrives in its normal position, there will be only a single cycle because the slide member will become automatically relatched in restored position. Prolongedly sustained operations of these same keys will produce distinctly terminated cycles following each other slightly spaced until key pressure is removed. At the end of any cycle in which any of these keys is released, its related slide member will become relatched and the clutch 66, 70 then stands open.

*Item Repeat Mechanism*

When an item is to be registered repeatedly an indexed amount is required to be retained in a set-up mechanism. The repeat key 242, whenever operated, will have this effect but because the means for this is not a part of this invention it is not shown. Whenever said repeat key 242 is operated and held down it will cause an entry of the set-up amount, once or repeatedly, until the said key is released. While the key 242 is held operated the machine will cycle uninterruptively and thus in continuant succession. The key 242 is urged to restore by a spring 244. When the key 242 is depressed it releases its associated latch element 246, see FIGURE 2, so that the slide member 249 becomes spring operated. A pin 254 on the key 242 serves to limit the down stroke of the latter but in distinction from the lower pins on the other keys this pin has no coaction with the latch or bell crank 246. This is because the key 242 is required to be returnable readily while the associated slide member 249 may stand fully or partially released.

As has been stated, the repeat key 242 when held down for causing multiple entries of a set-up amount, will cause also the machine to cycle without interruption. To this end, the key 242 has a stud 278 overlying a face on the link 93 and when such key is operated it will swing said link downwardly about its rear end to bring the horizontal portion of said L-shaped solt into alignment with the pin 94. Therefore, so long as said key 242 is held operated, the link 93 can have no restoring effect on the arm 78, the slide 249 and the clutch controlling lever 83. The link may be said to stand uncoupled from the arm 78. The link 87 and thus also the link 93 will reciprocate then idly because the spring 95 has a slight rearward urge which causes the roller 86 to follow the cam 57. The item will be registered repeatedly so long as this repeat condition prevails. When pressure is removed from the key 242, the link 93 due to a nose overlying the pin 278, will be upwardly urged and then will so move as soon as the vertical portion of the L-shaped slot registers with the pin 94. This is as soon as the roller 86 follows into the low sector of the cam 57. Therefore, if the key is released before the high position of the cam 57 is at the roller, then the link 93 will become coupled with the arm 78 to effect its restoration in the same cycle. If not, then a further cycle will follow toward the end of which the arm 78 will be restored.

Thus it will be seen that a momentary depression of the key 242 will initiate a single amount entering cycle, but a retention of the same key in depressed position until about mid-cycle time will cause a repeat cycle to follow directly.

The above description of a preferred embodiment is illustrative only and variations of structure and functional cooperation are possible without departure from the spirit of the invention as set forth in the following claims.

What is claimed is:

1. In an adding machine having a power source, a cycling shaft and a normally open clutch adapted to be closed to connect said shaft to said power source for machine cycling action; the combination with a plurality of different function instituting cycling keys, of members individually related to said keys and movable each from a normal to an operated position, means to urge individually said members toward their operated positions, individual means associated with each member to hold it in normal position, each such means being releasable by one of said keys to cause the operation of its related member, a clutch controlling means subject to operation by any of said members to close said clutch, means controlled by each of said members through operation thereof to block the related key against restoration, a restoring means for said members and said clutch controlling means and including means governed by said shaft to permit normally the operation of any of said members and adapted to restore any operated member in the course of a cycle as well as to cause said clutch automatically to open at the conclusion of the cycle, and means whereby any holding means is controlled by its related key to become effective only if such key is permitted to restore.

2. In an adding machine having a power source, a cycling shaft and a normally open clutch adapted to be closed to connect said shaft to said power source for machine cycling action; the combination with two function instituting cycling keys, of members individually related to said keys and movable each from a normal to an operated position, means to urge individually said members toward their operated positions, individual means associated with each member to hold it in normal position, each such means being releasable by one of said keys to cause an operation of its related member, a clutch controlling means subject to operation by any of said members to close said clutch, means controlled by only one of said members through operation thereof to block its related key against restoration pending the restoration of the same member, restoring means for said members as well as said controlling means and including means governed in the full cycle position of said shaft to permit either of said members to become operated through release of their holding means, said restoring means adapted in a late cycle phase to restore either of said members and in conjunction therewith to cause the clutch to open as the cycle concludes, and means responsive to the operation of said other key to release its related holding means and to incapacitate said restoring means until such key is released, whereby under the control of such key the machine will uninterruptively cycle until the release of such key is effected.

3. The invention set forth in claim 2, inclusive means controlled by said cycling shaft and associated with said restoring means so that if said other key is released before a certain point in the cycle, said restoring means will be effective in the same cycle, and so that if the same key is released beyond such point in the cycle, the restoring means will instead be effective in the next cycle.

4. In an adding machine having a power source, a cycling shaft and a normally open clutch adapted to be closed to connect said shaft to said power source for machine cycling action; the combination with a function instituting cycling key, of a member related to said key and movable from a normal to an operated position, means to urge said member toward an operated position, means associated with said member and adapted to hold it upon its movement to normal position and being releasable by said key to cause an operation of said member, a clutch controlling means subject to operation by said member to close said clutch, restoring means for said member and including means governed in the full cycle position of said shaft to permit said member to become operated through release of its holding means, the said restoring means adapted in a late cycle phase to restore said member and also to cause said clutch to open, means response to the operation of said key to release its related holding means and to incapacitate said restoring means until such key is released, and means controlled by said cycling shaft and associated with said restoring means so that if said key is released before a certain point in a cycle, said restoring means will be effective but otherwise will become effective in the next cycle.

5. In an adding machine having a power source, a cycling shaft and a normally open clutch adapted to be closed to connect said shaft to said power source for machine cycling action; the combination with a plurality of different function instituting cycling keys, of members individually related to said keys and movable each from a normal to an operated position, means to urge individually said members toward their operated positions, individual means associated with each member to hold it in normal position, each such means being releasable by one of said keys to cause the operation of its related member by the urging means, a clutch controlling means subject to the operation by any of said members to close said clutch, means controlled by each of said members through operation thereof to block the related holding means against restoration pending substantially the full restoration of any operated member, a restoring means for said members and said clutch controlling means and including means governed by said shaft to permit normally the operation of any of said members and adapted to restore any operated member in the course of a cycle as well as to cause said clutch controlling means automatically to open the clutch at the conclusion of each instituted cycle with an attendant arrest of the cycling shaft, any of said keys during continued depression preventing the return of its related holding means to operative holding position, and means effective upon the release of operating pressure on any operated key to bias such key and its related holding means to their normal positions, whereby upon operation of any one of said keys there will ensue one or more distinctly terminated cycles of said shaft, the number of cycles being depending on the time operating pressure is released from the key.

6. In an adding machine having a power source, a cycling shaft and a normally open clutch adapted to be closed to connect said shaft to said power source for machine cycling action; the combination with a plurality of different function instituting cycling keys, of members individually related to said keys and movable each from a normal to an operated position, means to urge individually said members toward their operated positions, a latch individually associated with each member with a shoulder thereof to hold it in a normal position, each such latch being releasable by one of said keys to cause the operation of its related member by the urging means, a clutch controlling means subject to the operation by any of said members to close said clutch, edge means on each member effective with respect to its related latch to block its restoration of the operated member, a restoring means for said members and said clutch controlling means and including means governed by said shaft to permit normally the operation of any of said members and adapted to restore any operated member in the course of a cycle as well as to cause said clutch controlling means automatically to open the clutch at the conclusion of each instituted cycle with an attendant arrest of the cycling shaft, any of said keys during continued depression preventing the return of its related holding means to operative holding position, and means effective upon the release of operating pressure on any operated key to bias such key and its related latch to their normal positions, whereby upon operation of any one of said keys there will ensue one or more distinctly terminated cycles of said shaft, the number of such cycles being depending on the time the operating pressure is released from the key.

References Cited in the file of this patent

UNITED STATES PATENTS

| | | |
|---|---|---|
| 2,360,005 | Mehan | Oct. 10, 1944 |
| 2,361,002 | Anderson | Oct. 24, 1944 |
| 2,660,374 | Hopkins et al. | Nov. 24, 1953 |
| 2,678,160 | Hutton | May 11, 1954 |

FOREIGN PATENTS

| | | |
|---|---|---|
| 668,704 | Germany | Dec. 9, 1938 |